US009593284B2

(12) United States Patent
Morris (10) Patent No.: US 9,593,284 B2
(45) Date of Patent: Mar. 14, 2017

(54) METHODS FOR THE PREPARATION AND DELIVERY OF FUEL COMPOSITIONS (71) Applicant: Gane Energy & Resources Pty Ltd, Richmond (AU)

(72) Inventor: Greg Morris, Beaumaris (AU)

(73) Assignee: Gane Energy & Resources Pty Ltd, Victoria (AU)

(*) Notice: Subject to any disclaimer, the term of this patent is extended or adjusted under 35 U.S.C. 154(b) by 284 days.

(21) Appl. No.: 14/551,361

(22) Filed: Nov. 24, 2014

(65) Prior Publication Data

US 2015/0075471 A1 Mar. 19, 2015

Related U.S. Application Data (63) Continuation of application No. PCT/AU2013/000555, filed on May 24, 2013.

(30) Foreign Application Priority Data

May 25, 2012 (AU) .................................. 2012902180

(51) Int. Cl.
*C10L 1/18* (2006.01)
*C10L 1/02* (2006.01)
(Continued)

(52) U.S. Cl.
CPC ................ *C10L 1/026* (2013.01); *C10L 1/10* (2013.01); *C10L 1/1852* (2013.01); *C10L 10/12* (2013.01);
(Continued)

(58) Field of Classification Search
CPC .......... C10L 1/026; C10L 1/10; C10L 1/1852; C10L 2270/026; C10L 10/12; C10L 10/14;
(Continued)

(56) References Cited

U.S. PATENT DOCUMENTS 4,603,662 A 8/1986 Norton et al.
5,906,664 A 5/1999 Basu et al.
(Continued)

FOREIGN PATENT DOCUMENTS

EP          1106803     *  6/2002
WO    WO2011085657 A1    7/2011
WO    WO2012068633 A1    5/2012

OTHER PUBLICATIONS

International Search Report for International Application No. PCT/AU2013/000555, mailed Aug. 29, 2013.
(Continued)

*Primary Examiner* — Cephia D Toomer
(74) *Attorney, Agent, or Firm* — Fish & Richardson P.C.

(57) ABSTRACT

A process for generating a main fuel composition comprising methanol and water and not more than 20% by weight dimethyl ether, and a fumigant comprising dimethyl ether, the process comprising: providing a pre-fuel composition comprising methanol and dimethyl ether, adding water to the pre-fuel composition to cause or aid evaporation of at least a portion of the dimethyl ether from the pre-fuel composition, collecting the portion of dimethyl ether evaporated from the pre-fuel composition for use as a fumigant, and using the remainder of the pre-fuel composition comprising methanol and water as a main fuel composition. The water may be at a temperature above ambient.

20 Claims, 4 Drawing Sheets (51) Int. Cl.
   *C10L 1/10*     (2006.01)
   *F02B 49/00*    (2006.01)
   *C10L 1/185*    (2006.01)
   *C10L 10/12*    (2006.01)
   *C10L 10/14*    (2006.01)
   *F02D 19/06*    (2006.01)
   *F02D 19/08*    (2006.01)
   *F02M 25/025*   (2006.01)
   *F02B 47/02*    (2006.01)

(52) U.S. Cl.
   CPC .............. *C10L 10/14* (2013.01); *F02B 49/00* (2013.01); *F02D 19/0647* (2013.01); *F02D 19/081* (2013.01); *C10L 2200/04* (2013.01); *C10L 2270/026* (2013.01); *C10L 2290/24* (2013.01); *F02B 47/02* (2013.01); *F02M 25/025* (2013.01); *Y02T 10/36* (2013.01)

(58) Field of Classification Search
   CPC .. C10L 2200/04; C10L 2290/24; F02B 49/00; F02B 47/02; F02M 25/025; F02D 19/0647; F02D 19/081; Y02T 10/36
   See application file for complete search history.

(56) References Cited

U.S. PATENT DOCUMENTS 6,340,003 B1 *  1/2002  Schoubye ................. F02B 3/08
                                                      123/3
7,449,034 B1    11/2008 Mikkelsen et al.

OTHER PUBLICATIONS

International Preliminary Report on Patentability for International Application No. PCT/AU2012/000555, mailed Jun. 17, 2014.

* cited by examiner

METHODS FOR THE PREPARATION AND DELIVERY OF FUEL COMPOSITIONS

The present invention relates to methods for the preparation of a fuel composition and for delivery of fuel compositions to locations for their use. The present invention also relates to methods for the generation of fumigants, or fumigant vapours, for use in compression ignition engines.

BACKGROUND OF THE INVENTION

The pursuit for fuel alternatives to conventional fossil fuels is primarily driven by the need for a 'clean' emissions fuel coupled with low production costs and wide availability. Much attention is paid to the environmental impact of fuel emissions. Research into alternative fuels focuses on fuels that will reduce the amount of particulate matter and oxides produced by fuel combustion as well as fuels that reduce the non-combusted fuel and $CO_2$ emissions and other products of combustion.

Fuel alternatives for complete or partial replacement of traditional fuels have not become widely used.

One major disadvantage with the complete replacement of traditional fuels, and in particular fuels for compression ignition engines (diesel fuels), with a renewable replacement fuel, relates to the perceived problems associated with the low cetane index of such fuels. Such fuels present problems for achieving ignition in the manner required for efficient operation of the engine.

The present applicant has developed new fuel compositions for use in compression ignition (diesel) engines with an improved emissions profile without a major adverse impact on fuel efficiency and/or engine performance. The fuel composition is a two-part fuel composition, with a main part based on methanol and water, which is introduced into the combustion chamber of the engine, and a fumigant comprising an ignition enhancer, such as dimethyl ether, fumigated into the intake air stream prior to compression and introduction of the main fuel.

The two fuel parts—the main fuel comprising methanol and water, and the fumigant comprising dimethyl ether—may be transported through liquid pipelines from the point of manufacture, to the point of usage, such as a shipping terminal, train terminal, or remote community using a compression ignition engine to generate power. Moving bulk energy via liquid pipeline is a long standing and cost effective technique for moving large quantities of energy over long distances with minimum visual impact.

Whilst such techniques for moving fuel via liquid pipelines have their advantages, dimethyl ether cannot be transported in pipelines in liquid form under atmospheric pressure, and would require pressurisation to maintain the dimethyl ether in liquid form. It has been proposed by the present applicant to transport the dimethyl ether required for use in a fumigant as a component of a "pre-fuel composition" comprising methanol and dimethyl ether, and to separate the ether from the methanol, to generate a methanol-water main fuel part, and a dimethyl ether second fuel part, or fumigant.

The applicant has recognised that further improvements in fuel compositions, and/or the systems/procedures enabling them to be used commercially, could provide further advantages that would make them even more attractive as a replacement for traditional fuels.

SUMMARY OF THE INVENTION

In accordance with the present invention there is provided a process for generating a main fuel composition comprising methanol and water and not more than 20% by weight dimethyl ether, and a fumigant comprising dimethyl ether, the process comprising:
providing a pre-fuel composition comprising methanol and dimethyl ether,
adding water to the pre-fuel composition to cause or aid evaporation of at least a portion of the dimethyl ether from the pre-fuel composition,
collecting the portion of dimethyl ether evaporated from the pre-fuel composition for use as a fumigant, and
using the remainder of the pre-fuel composition comprising methanol and water as a main fuel composition.

The process may comprise the further steps of:
directing the collected portion of dimethyl ether, in vapour form, into the intake air stream of a compression ignition engine, as a fumigant, and
directing the remainder of the pre-fuel composition into the compression ignition engine as the main fuel for the compression ignition engine.

The excessive application of heat, and the consequent cost, of driving the dimethyl ether off from the pre-fuel composition can be avoided when generating the two fuel compositions from a pre-fuel composition in this way. Heat application techniques involving complex engineering such electric, gas-powered or engine coolant, can be avoided. Water addition, optionally warm or hot water addition, to a combination of methanol and dimethyl ether has the effect of displacing the dimethyl ether, through evaporation of dimethyl ether from the original methanol/dimethyl ether composition, to varying degrees depending on the prevailing temperature conditions and the amount of water added. The clever utilisation of this phenomenon in combination with the concept of delivering two products (a main fuel and a fumigant) as a single pre-fuel composition which is then divided into two streams, enables the formation of a very cost-effective and safe way to transport a fuel as one composition, for use in a compression ignition engine. Moreover, water at a temperature above ambient, produced as a byproduct in the engine operation and exhaust treatment, can be conveniently used in this process.

Expressed another way, such "external heat sources" can be avoided, by the use of water at a temperature that provides sufficient sensible heat to provide the required quantity of DME fumigant, and target water composition of the main fuel.

According to preferred embodiments, the step of adding water to the pre-fuel composition to cause evaporation of at least a portion of the dimethyl ether may be in some cases performed without the application of direct heat. Alternatively, water at a temperature above ambient will be sufficient to drive off the required amount of dimethyl ether. The water may be at any suitable temperature specific to the prevailing conditions. The water temperature may, for example, be between 30° C. and 80° C. Further temperature ranges are outlined below. Externally sourced heat, eg from electricity, gas or engine coolant may also be used as a supplement to the water addition technique to cause or aid evaporation of dimethyl ether from the pre-fuel composition. In some embodiments, no additional external heat source is required.

According to some embodiments, the process comprises the step of:
transporting the pre-fuel composition comprising methanol and dimethyl ether from a first location to a second location remote from the first location.

By "remote" it is meant that the location is spaced apart from the second location. The separation distance may be, for example, a matter of a few meters (such as more than 50 meters), or a few kilometers (such as 1 km or more, such as at least 5 km or at least 10 km).

According to one embodiment, the pre-fuel composition is transported in a liquid pipeline. The liquid pipeline may, therefore, be a few meters long (such as more than 50 meters long), or a few kilometers long (such as 1 km or more, such as at least 5 km or at least 10 km long).

The remainder of the pre-fuel composition comprising methanol and water that remains after evaporation of the dimethyl ether may have the composition adjusted prior to use, or may be used without further adjustment in its composition. Similarly, the dimethyl ether evaporated for use as a fumigant may be used as the fumigant without adjustment in composition, or the fumigant comprising dimethyl ether may adjusted in composition, to include components in addition to the dimethyl ether. The dimethyl ether evaporated for use as a fumigant may be used directly, in vapour form or otherwise, in the engine.

The process may further comprise the steps of:
fumigating an intake air stream of a compression ignition engine with the fumigant comprising dimethyl ether;
introducing the fumigated intake air into a combustion chamber in the engine and compressing the intake air;
introducing the main fuel into the combustion chamber; and
igniting the main fuel/air mixture to thereby drive the engine.

According to another aspect, there is also provided a process of operating a compression ignition engine using a main fuel comprising methanol and water and not more than 20% by weight dimethyl ether, including:
providing a pre-fuel composition comprising methanol and dimethyl ether,
adding water to the pre-fuel composition to cause or aid evaporation of at least a portion of the dimethyl ether from the pre-fuel composition,
collecting the portion of dimethyl ether evaporated from the pre-fuel composition for use as a fumigant,
using the remainder of the pre-fuel composition comprising methanol and water as a main fuel composition,
directing the collected portion of dimethyl ether, in vapour form, into the intake air stream of a compression ignition engine, as a fumigant,
introducing the fumigated intake air into a combustion chamber in the engine and compressing the intake air;
introducing the main fuel into the combustion chamber; and
igniting the main fuel/air mixture to drive the engine.

According to another aspect, there is provided a method for supplying fuel to a compression ignition engine, the method comprising:
supplying a pre-fuel composition comprising methanol and dimethyl ether,
adding water to the pre-fuel composition to cause or aid evaporation of at least a portion of the dimethyl ether from the pre-fuel composition,
supplying the portion of dimethyl ether evaporated from the pre-fuel composition to an air intake of the compression ignition engine, or to a tank that is in fluid connection to the air intake of the compression ignition engine, for use as a fumigant,
supplying the remainder of the pre-fuel composition comprising methanol and water to a second tank that is in fluid connection to a combustion chamber of the compression ignition engine for use as a main fuel composition.

The method may further comprise the steps of:
fumigating an intake air stream of the compression ignition engine with the fumigant comprising dimethyl ether supplied from the first tank;
introducing the fumigated intake air into a combustion chamber in the engine and compressing the intake air;
introducing the main fuel from the second tank into the combustion chamber; and
igniting the main fuel/air mixture to thereby drive the engine.

The step of fumigating the intake air stream may comprise directing the collected portion of dimethyl ether, in vapour form, into the intake air stream of a compression ignition engine.

The exhaust resulting from fuel combustion may contain low impurities, making it ideal for subsequent processing. As one example, the $CO_2$ may be converted back to methanol to directly reduce the greenhouse gas $CO_2$ or high purity $CO_2$ can be used for organic growth such as algae for multiple end uses including methanol manufacture, utilizing energy sources which can include renewable sources, including solar.

In some embodiments, water generated during fuel combustion can be recovered, which is a major advantage for remote areas where water is scarce. In other instances, heat generated in operation of the diesel engine can be utilised for local area heating requirements. Some embodiments accordingly provide systems for power generation through the operation of a diesel engine which utilise the water and/or heat output of the engine in a suitable way.

In accordance with another aspect, there is provided a process for generating power using a compression ignition engine fuelled by a main fuel composition comprising methanol and water and not more than 20% by weight dimethyl ether, the process comprising:
providing a pre-fuel composition comprising methanol and dimethyl ether,
adding water to the pre-fuel composition to cause or aid evaporation of at least a portion of the dimethyl ether from the pre-fuel composition,
collecting the portion of dimethyl ether evaporated from the pre-fuel composition for use as a fumigant,
using the remainder of the pre-fuel composition comprising methanol and water as a main fuel composition,
operating a compression ignition engine using the main fuel composition to generate power;
fumigating the inlet air stream of the compression ignition engine with the fumigant comprising dimethyl ether;
treating engine exhaust to recover exhaust heat and/or water from the engine, and
redirecting the heat and/or water for further use.

BRIEF DESCRIPTION OF THE DRAWINGS

Embodiments of the present invention will now be described by way of example with reference to the accompanying drawings, wherein.

DETAILED DESCRIPTION

The processes and methods described herein relate to the generation of two-part fuels from a pre-fuel composition, which are then used to operate a compression ignition (CI) engine.

Details regarding the uses of the two-part fuel, once created, are set out in the applicant's co-pending applications PCT/AU2011/001530 and PCT/AU2011/001531, the entirety of which is incorporated herein by specific reference. These co-pending applications describe how the compression ignition engine is operated and controlled, the generation of power, the recovery and re-use of heat and water generated during the operation of the engine, amongst other related matters.

Underlying Theory

The addition of water to a pre-fuel composition comprising methanol and dimethyl ether has the effect of displacing the dimethyl ether, through evaporation of the dimethyl ether from the methanol/dimethyl ether composition, to varying degrees depending on the prevailing temperature conditions.

The applicant has examined the impact that temperature, dimethyl ether percentage content in the pre-fuel, and quantity of water added, has on the ability to use water to evaporate the dimethyl ether, for consequent recovery and use as a fumigant in a compression ignition engine. A computer model was built examining gas-liquid equilibria, with analysis of a wide range of compositions including vapour pressure, involving the ternary liquid mixture methanol, water and dimethyl ether (DME). Subsequently the actual vapour pressures of various compositions were measured to prove that there is improved dimethyl ether evaporation through addition of water to pre-fuel compositions.

A result of this analysis was that the presence of water destabilises DME in the ternary liquid mixture, making generation of DME rich fumigant easier than if water was not present, by enabling this separation from the liquid ternary mixture into a DME rich vapour phase to be obtained at lower temperature. At expected water levels in the liquid fuel, it is anticipated that on full load operation of a diesel engine, sufficient DME can be generated for mid-range loading load to full engine loading, with no external heating of the bulk liquid fuel being required.

Figure 1:
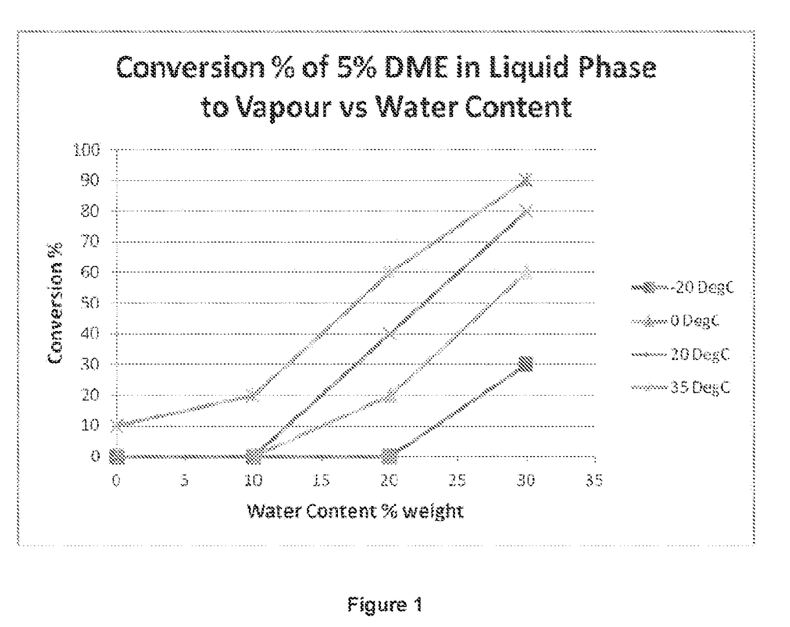
FIG. 1 is a graph demonstrating the percentage conversion of the DME component in a 5% DME:95% methanol (by weight) pre-fuel composition from the liquid phase to the vapour phase, at 4 different temperatures, with the addition of water at increasing volumes of water (as a weight % of the pre-fuel composition weight).

FIG. 1 presents a graph which shows under equilibrium conditions at atmospheric pressure how much DME present in the liquid phase can vapourise, at various water contents in the liquid phase (through addition of water in the process steps; this is expressed as a percentage of the DME in the ternary solution, eg 5%). Separate lines are shown for temperatures of −20, 0, 20 and 35 Deg C. The graph shows that with 5% DME concentration originally in the liquid phase, no vapour generation to create a fumigant is possible at −20° C., 0° C. or 20° C., with a 5% DME, 10% Water and 85% methanol ternary mixture. At 35° C., 20% of the DME present may be evaporated through the addition of water (to the 10% level) to yield fumigant vapour comprising DME.

Still referring to FIG. 1, if the water content is increased from 10% to 20% this situation is significantly changed. At −20° C. there is still no vapour generation, however at 0, 20 and 35° C., DME vapour generation levels of 20%, 40% and 60% respectively can be achieved.

At a water content of 30% the conversion % of DME originally in the liquid base (of 5%) will increase significantly to 30%, 60%, 80% and 90% at temperatures of −20, 0, 20 and 35° C. respectively. This demonstrates that even at a low DME content of 5% the ability of water to reject DME into the vapour phase is significantly enhanced as water contents increase.

Figure 2:
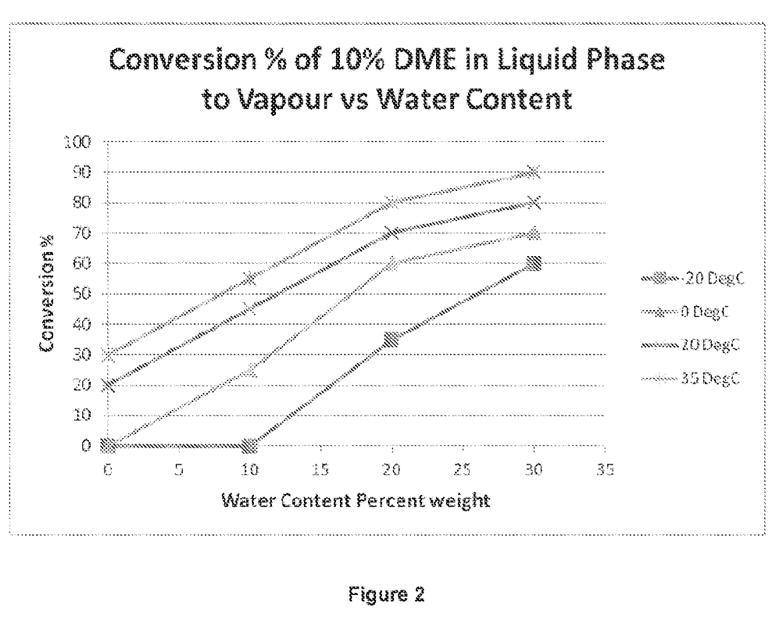
FIG. 2 is a graph demonstrating the percentage conversion of the DME component in a 10% DME:90% methanol (by weight) pre-fuel composition from the liquid phase to the vapour phase, at 4 different temperatures, with the addition of water at increasing volumes of water (as a weight % of the pre-fuel composition weight).

FIG. 2 is similar to FIG. 1, but relates to a pre-fuel composition initially containing 10% DME to 90% methanol.

The major difference between the two Figures is that at 10% DME and 20% water in the liquid phase, at −20° C. and 0° C., 35% and 60% respectively can be converted to vapour, much higher than the corresponding conversions of zero and 20% which were possible at the lower DME content of 5%.

At a higher water content of 30% the conversions at −20° C. and 0° C. are both further increased by 10% compared to the 20% water composition base ternary mixture.

These Figures show that it is possible to achieve a significant conversion of DME liquid to DME vapour by increasing water above 10%, with 20% water and 10% DME in a ternary mixture with methanol allowing a 35% conversion to vapour at a temperature of −20° C. at atmospheric pressure.

The enhanced property of rejection of DME from the liquid phase, attributable to the presence of water at a suitable temperature is expected to make the generation of DME rich fumigant less costly and more reliable, with no externally applied direct heating being required to effect a conversion of DME from the liquid phase, to vapour which can be used as fumigant for a diesel engine.

Figure 3:
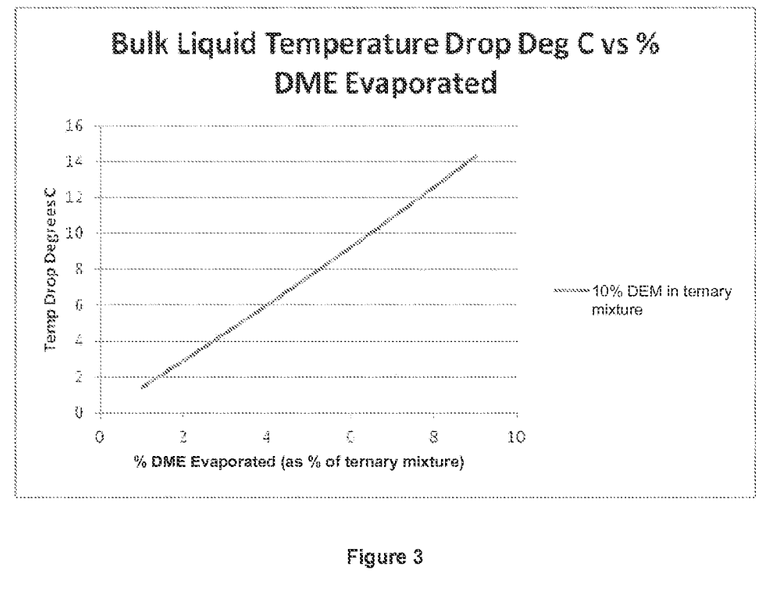
FIG. 3 is a graph of the % DME evaporated as a % of the ternary fuel composition (Y axis) against temperature drop in degrees C. (X axis).

The energy required to evaporate the DME comes from a sensible temperature drop in the bulk liquid. A graph of this temperature drop, plotted against the % DME is shown in FIG. 3.

The destabilising of DME in liquid methanol, in the presence of water, can make the water concentration of the ternary mixture a control parameter for controlling the proportion of DME converting to vapour. In particular, even at a temperature of −20° C. fuel temperature it is possible to convert more than 50% of the DME in the cold liquid ternary mixture to vapour, by simply adding sufficient water to a mixture of DME and methanol. It is noted that under these conditions some methanol could be added to the water (so that a combination of water and methanol is added to the pre-fuel) to depress the freezing point, or other measures taken such as using heat from the engine coolant, to ensure that the water remains as a liquid and not as a solid in the form of ice.

In addition to the destabilising effect of water, the evaporation of DME is assisted by the following physical aspects:
1. DME has a low heat of vaporisation of 410 KJ/kg (methanol=1100 KJ/kg)
2. The carrying media being water and methanol have a high heat capacity, enabling a resultant small temperature reduction in the bulk liquid, allowing a substantial amount of DME rich vapour to be driven off, enough to sustain engine firing at mid to full range engine loading. The high heat capacity of water allows heated water to perform a dual role of destabilising dimethyl ether due to interaction between polar water and methanol molecules, and using the high heat capacity of water at suitably higher temperature to carry sufficient heat into the fuel mixture to drive off the dimethyl ether fumigant required.

When applying this to practical processes for generating a main fuel composition and a fumigant from a pre-fuel composition, it is desirable to achieve significant displacement or evaporation of the DME from the pre-fuel. According to some embodiments, at least 5%, preferably at least 10%, 20%, 30% 40%, 50% or 60% of the DME present in the pre-fuel is evaporated from the pre-fuel composition through the addition of water. The amount may be up to 100% of the DME present in the pre-fuel composition, or in some embodiments it is lower, such as up to 95%, 90% or 80% of the DME present in the pre-fuel composition. The term "portion" encompasses all of these amounts, from a small % amount (as small as 0.5% or above) to a large percentage amount (for example a majority, or up to 95%). The term "at least a portion" encompasses a portion or all of the DME. Each lower limit on the amount can be combined with an upper end limit without restriction to identify suitable sized portions.

Test work subsequently performed, as shown in Table 1 below, supports the general principal underlying the invention. The use of water addition to the pre-fuel composition diminishes the heat load required to evaporate the DME from the pre-fuel composition.

Pre-Fuel Composition

In some embodiments, the pre-fuel may be water-free. In other embodiments, the pre-fuel may comprise a lower water content, such as up to 0.5%, 1%, 2%, 3%, 4% or 5% water. Whilst some water is possible, this will impact on the amount of dimethyl ether that will be able to stay in the liquid phase in the pre-fuel composition at atmospheric pressure of 101.3 kPa, since, as described above, water displaces dimethyl ether to an increasing extent over increased temperatures. Accordingly, the presence of water in the pre-fuel composition is better suited to cold climates.

According to the present application, part or all of the dimethyl ether component in the pre-fuel is separated from the other components of the pre-fuel composition (notably the methanol). The separated dimethyl ether component can then be fumigated into the compression ignition engine as a fumigant, separately to the remaining part of the pre-fuel composition, which is used as the main fuel composition, either direct, or with further adjustment in composition before use. The amount of dimethyl ether in the pre-fuel may be up to 30% by weight, or up to 20% by weight, or up to 10% by weight, or up to 9% by weight. Amounts above 30% are also possible. The amount of dimethyl ether included in the pre-fuel may be selected based on the overall process design, the prevailing conditions, and the other components present in the pre-fuel composition.

For example, in cold winter conditions, the amount of dimethyl ether in the pre-fuel composition will typically be greater than that required in warm summer conditions. In winter, the dimethyl ether content in the pre-fuel composition may be between 10% and 30% by weight of the pre-fuel composition. In summer, it may be between 2% and 15%. The amount will be chosen based on the need for increased dimethyl ether in the pre-fuel required before dimethyl ether can be driven off the pre-fuel composition through the addition of water (with may optionally be heated water), for collection in sufficient amounts to support the fumigant demand of the engine. In warmer climatic conditions, it is easier to drive off more dimethyl ether compared to cooler climatic conditions.

The process may therefore involve the step of calculating the amount of dimethyl ether required to be removed from the pre-fuel composition in the prevailing climatic temperature conditions to meet the fumigant demand of the engine, and controlling the pre-fuel composition to have the required dimethyl ether level to enable the removal of the required amount of dimethyl ether.

The temperature of the water added to the pre-fuel composition may be ambient temperature, or above ambient. In some embodiments, it is above ambient temperature water (e.g. heated water). The water may be in heated form through the use of a water stream from the engine operation or any other hot water loop associated with the engine, as in the case of the use of a compression ignition engine for power generation for powering a community. The temperature of the water may for example be between 20° C. and 100° C., such as at least 25° C., at least 30° C., at least 40° C., at least 50° C., at least 60° C. or at least 70° C. The water temperature may be no more than 80° C., no more than 70° C., no more than 60° C., no more than 50° C., no more than 40° C. Each maximum and minimum can be combined without restriction to form a range, provided that the maximum is higher than the minimum. Thus, the water temperature range may be between 30° C. and 50° C., or between 40° C. and 60° C. or between 40° C. and 80° C., as three examples.

Other optional components of the pre-fuel composition are described further below in the context of the main fuel composition that is generated from the pre-fuel upon addition of water.

The reference to "providing" a pre-fuel composition is used broadly. The pre-fuel may be supplied by a supplier, manufactured, or otherwise provided so as to contain methanol and dimethyl ether.

The manner of addition of water to the pre-fuel composition may be through any suitable means. Water may be added batch-wise to a volume of pre-fuel, or through a continuous process. This may occur in any suitable vessel, pipeline, or otherwise. The water may be added to the pre-fuel in a fuel mixer vessel, as an example. In another embodiment, the water may be added as a water stream to a stream of pre-fuel, in liquid pipelines.

A portion of the dimethyl ether present in the pre-fuel is evaporated from the pre-fuel composition up on the addition of water. This is collected for use as a fumigant. The term "collected" is used broadly to encompass collection in a vessel for storage and later use (in the process, or for other applications where there is a volume of dimethyl ether in excess of the engine requirements), and also encompasses direct channeling for use in the compression ignition engine. In the case of collection in a vessel, the collection step may comprise liquefaction by compression prior to storage in the vessel.

The remainder of the pre-fuel composition is used as a main fuel composition. Details of the options available for adjusting the composition of the main fuel composition prior to use in the compression ignition engine are outlined in further detail below.

The pre-fuel composition comprising methanol and dimethyl ether can be produced at one location and transported to another location for use in fueling a compression ignition engine. The transporting of the pre-fuel may be by way of piping through a pipeline. The first location may be a methanol production plant location, and the other location (the second location) is a location remote from the first location. The distance between those locations may be very short, or far. The reference to a "remote" location is used broadly to refer to somewhere other than the location of methanol production, and includes adjacent locations. The second location, or remote location, would typically be at least 1 kilometer away, and perhaps many kilometers away. The second location may be at least 1, 2, 5, 10, 15, 20, 40, 50, 100, 200, 500 or 700 kilometers away from the first location. The distance between the first and second locations could be as great as 900 or up to 1500 kilometers. The second location may be the location of a compression ignition engine for electricity generation, or a shipping port, or a train siding or any other suitable location where the two-part fuel is required.

According to preferred embodiments, the step of adding water to the pre-fuel composition to cause evaporation of at least a portion of the dimethyl ether may be performed without the direct application of heat. However, to allow for maximum flexibility, especially when operating in low temperature conditions, application of heat during the step of adding water to the pre-fuel composition may be provided for.

The term "fumigation" in relation to the intake air refers to the introduction of a material or mixture, in this case a fumigant comprising dimethyl ether, into the intake air stream to form a vapor or gas through which the ignition enhancer is well distributed. In some embodiments the material is introduced in a small amount, generally through spraying a fine spray of the material into the intake air stream or injected as a gas.

The fumigated intake air is introduced into a combustion chamber in the engine and compressed. The main fuel composition is introduced into the combustion chamber, so as to be combined with the compressed intake air/fumigant mixture. This mixture is then ignited to drive the engine. Further aspects and description of the mode of operation of the engine are provided in our co-pending application, referred to above.

Features of the Main Fuel Composition Generated from the Pre-Fuel Composition

The main fuel composition which is generated from the pre-fuel composition comprises methanol and water. It is noted that the terms "main fuel composition" and "main fuel" may be used synonymously. The fuel is a compression ignition engine fuel, that is, a diesel engine fuel.

To date, methanol has not found commercial application in compression ignition engines. The disadvantages with using methanol as an engine fuel, either neat or blended, is highlighted by its low cetane index, which is in the range of 3 to 5. This low cetane index makes methanol difficult to ignite in a CI engine. Blending water with methanol further reduces the cetane index of the fuel making combustion of the methanol/water blend fuel even more difficult, and thus it would have been considered counter-intuitive to combine water with methanol for use in CI engines. The effect of water following fuel injection is one of cooling as the water heats up and evaporates, further lowering the effective cetane.

However, it has been found that a methanol-water fuel combination can be used in a compression ignition engine in an efficient manner and with cleaner exhaust emissions, provided that the engine is fumigated with a fumigant comprising an ignition enhancer.

Methanol has been described for use in fuels compositions previously, but as a heating or cooking fuel, where the fuel is burned to generate heat. The principles that apply to diesel engine fuels are very different, since the fuel must ignite under compression in the compression ignition engine. Very little, if anything, can be gleaned from references to the use of methanol and other components in cooking/heating fuels.

The main fuel may be a homogeneous fuel, or a single phase fuel. The fuel is typically not an emulsion fuel comprising separate organic and aqueous phases emulsified together. The fuel may therefore be emulsifier free. The accommodation of additive components in the fuel is assisted by the dual solvency properties of both methanol and water, which will enable dissolution of a wider range of materials across the various water:methanol ratios and concentrations which can be utilised. The pre-fuel is also a homogeneous fuel, or a single-phase fuel.

All amounts referred to in this document are by reference to weight, unless specified otherwise. Where a percentage amount of a component in the main fuel composition is described, this is a reference to the percentage of that component by weight of the entire main fuel composition.

In broad terms, the relative amount of water to methanol in the main fuel composition may be in the range of from 3:97 to 80:20 by weight. According to some embodiments, the minimum water level (relative to methanol) is 5:95, such as a minimum ratio of, 7:93, 10:90, 15:95, 19:81; 21:79. The upper limit of water (relative to methanol) in the composition according to some embodiments is 80:20, such as 75:25, 70:30, 60:40, 50:50 or 40:60. The relative amount of water in the composition may be considered to be in the "low to medium water" level range, or a "medium to high water" level range. The "low to medium water" level range covers the range from any of the minimum levels indicated above to a maximum of either 18:82, 20:80, 25:75, 30:70, 40:60, 50:50 or 60:40. The "medium to high water" level range covers the range from either 20:80, 21:79, 25:75, 30:70, 40:60, 50:50, 56:44 or 60:40 to a maximum of one of the upper limits indicated above. A typical low/medium water level range is 4:96 to 50:50, and a typical medium/high water level range is from 50:50 to 80:20. A typical low water level range is from 5:95 to 35:65. A typical medium level water range is 35:65 to 55:45. A typical high water level range is 55:45 to 80:20.

Considered in terms of the percentage of water in the entire main fuel composition by weight, the relative amount of water in the main fuel composition may be a minimum of 3.0%, or 4.0%, or 5%, 10%, 12,%, 15%, 20% or 22% by weight. The maximum amount of water in the entire main fuel composition may be 68%, 60%, 55%, 50%, 40%, 35%, 32%, 30%, 25%, 23%, 20%, 15% or 10% by weight. Any of the minimum levels may be combined with a maximum level without limitation, save for the requirement that the minimum level be below the maximum water level.

For a desirable brake thermal efficiency (BTE), the amount of water in the fuel composition in some embodiments is between 3% and 32% by weight. The optimal zone for a peak in brake thermal efficiency for a methanol-water compression ignition engine fuel is between 12% and 23% water in the main fuel composition, by weight. The range may be incrementally narrowed from the broader to the narrower of these two ranges. In some embodiments, this is combined with an amount of ignition enhancer in the main fuel composition that is not more than 15% by weight of the main fuel composition. Details of ignition enhancers are set out below.

For a maximum reduction in NOx emissions, the amount of water in the fuel composition in some embodiments is between 22% and 68% by weight. The optimal zone for a maximum reduction in NOx emissions is between 30% and 60% water by weight of the main fuel composition. The range may be incrementally narrowed from the broader to the narrower of these two ranges. Since NO is the main NOx emission component, reference may be made to NO emissions as being the greater proportion, of, or indicative of, the overall extent of NOx emissions.

In some embodiments, for a desirable balance of fuel properties and emissions, the main fuel composition comprises between 5% and 40% water by weight of the main fuel composition, such as between 5% and 25% water, between 5% and 22% water.

For the operation of the compression ignition engine with the methanol/water main fuel composition and fumigation, but without other ignition enhancement techniques such as air inlet preheating or blowing, the water content in the fuel may be at the low to medium level, preferably at the low water level. Where the water level is at the higher end, the process generally benefits from inlet air and/or main fuel preheating, to overcome the increased cooling effect of the increased water level in the main fuel composition. Preheating techniques are as described in our co-pending application, referred to above.

The amount of methanol in the total main fuel composition is preferably at least 20% by weight of the main fuel composition. According to some embodiments, the amount of methanol in the fuel composition is at least 30%, at least 40%, at least 50%, at least 60% or at least 70% of the fuel composition. The amount of water in the total main fuel composition may be at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 25%, at least 30%, at least 35%, at least 40%, at least 45%, at least 50%, at least 55%, at least 60%, at least 65% and at least 70%. As the weight of water in the main fuel composition increases it is increasingly more surprising that fumigation of the inlet air with a fumigant overcomes the penalty of water in the fuel in terms of igniting, with smooth operation in terms of COV of IMEP and producing net power out.

The combined amount of methanol and water in the total main fuel composition may be at least 75%, such as at least 80%, at least 85%, or at least 90% by weight of the fuel composition. The main fuel composition may comprise one or more additives, in a combined amount of up to 25%, or up to 20% or up to 15% or up to 10% by weight of the main fuel composition. In some embodiments, the total or combined level of additives is not more than 5% of the main fuel composition.

The methanol for use in the production of the pre-fuel composition, and consequently the main fuel composition, may come from any source. As one example, the methanol may be a manufactured or waste methanol, or a coarse or semi-refined methanol, or an unrefined methanol. Such methanol sources are referred to herein collectively as "crude methanols", and this term refers to methanol sourced from sources with a methanol content of less than 95% The crude methanol could typically contain mainly methanol, with the balance being water and amounts of higher alcohols, aldehydes, ketones or other carbon hydrogen and oxygen molecules arising during the normal course of methanol manufacture. Waste methanol may or may not be suitable depending on the degrees and types of contamination. The references in the above sections to ratios of methanol and water, or amounts of methanol in the fuel composition by weight, refer to the amount of methanol itself in the methanol source. Thus, where the methanol source is a crude methanol containing 90% methanol and other components, and the amount of this crude methanol in the fuel composition is 50%, then the actual amount of methanol is considered to be 45% methanol. The water component in the methanol source is taken into account when determining the amount of water in the fuel composition, and the other impurities are treated as additives when assessing the relative amounts of the components in the products, unless otherwise specified. The higher alcohols, aldehydes and ketones which may be present in the crude methanol may function as soluble fuel extender additives.

According to some embodiments, the pre-fuel composition comprises crude methanol. Thus, in some embodiments, the main fuel also comprises crude methanol. The term "crude methanol" encompasses low purity methanol sources, such as methanol sources containing methanol, water and up to 35% non-water impurities. The methanol content of crude methanol may be 95% or less. The crude methanol may be used directly in the fuel without further refining. Typical non-water impurities include higher alcohols, aldehydes, ketones. The term "crude methanol" includes waste methanol, coarse methanol and semi-refined methanol. It is a particular advantage of this embodiment that crude methanol containing impurities at higher levels can be used directly in the fuel for a CI engine without expensive refining. In this case, the additive (ie crude methanol impurities and other fuel composition additives excluding water) levels may be up to 60% of the main fuel composition (including impurities in the crude methanol). For main fuel compositions using a higher purity methanol (such as 98% or higher % pure methanol) as the source, the total additive level may be lower, such as not more than 25%, not more than 20%, not more than 15% or not more than 10%.

According to some embodiments, the methanol source for the pre-fuel is a high purity methanol. This refers to a methanol containing more than 95% methanol, preferably at least 96%, 97% or 98% methanol.

Any water of a suitable quality can be used as the source of water for performing the processes and methods of the invention. The water added in the process to drive off a portion of the dimethyl ether will form the water component of the main fuel composition (or at least a part of this). The source of water may be water included as part of un-distilled coarse methanol, or recycled water, or a crude or contaminated water (for example, sea water containing salts) purified by reverse osmosis, purified by activated substances such as activated carbon, or further chemical treatment, deionisation, distillation or evaporative techniques. The water may come from a combination of these sources. According to one embodiment, the water added in the process of the present application is water recovered from the exhaust of the compression ignition engine. This water may be recovered via heat exchangers and spray chambers or other similar operations. This recovery and reuse technique enables cleanup of exhaust emissions. The water in this case is recycled back to the engine with or without any captured unburnt fuel, hydrocarbons or particulates or other combustion products being returned to the engine and recycled to extinction via looping combustion steps, or treated by known means of purification. The water may in some embodiments be salt water, such as sea water, which has been purified to remove the salt therefrom. This embodiment is suited to marine applications, such as in marine CI engines, or for the operation of CI engines in remote island locations.

The water quality will impact corrosion through the supply chain up to the point of injection into the engine and engine deposition characteristics, and suitable treatment of main fuel with anti-corrosion additives or other methods may in these circumstances be required.

Additives in Main Fuel Composition, Through the Presence of Those Additives in the Pre-Fuel Composition or Through Adjustments Made to the Main Fuel Composition.

In some embodiments, the pre-fuel composition contains additives in addition to the methanol and dimethyl ether. In other embodiments, the pre-fuel composition consists of, or consists essentially of, methanol and dimethyl ether. The additives may be selected to enable the main-fuel composition that remains after the dimethyl ether evaporation step are appropriate for use of that main fuel composition without any further adjustment of the composition. In the alternative, additives may be added to the composition that remains after the dimethyl ether evaporation to adjust the composition to the composition required for use in the compression ignition engine.

Additives which may be present in the pre-fuel composition and/or the main fuel composition may be selected from one or more of the following categories, but not exclusively so:

1. Ignition improver additives. These may also be referred to as ignition enhancers. An ignition improver is a component that promotes the onset of combustion. Molecules of this type are inherently unstable, and this instability leads to "self start" reaction leading to combustion of the main fuel component (for example, methanol). The ignition improver may be selected from materials known in the art to have ignition enhancing properties, such as, ethers (including C1-C6 ethers such as dimethyl ether), alkyl nitrates, alkyl peroxides, volatile hydrocarbons, oxygenated hydrocarbons, and mixtures thereof.

In addition to the typical ignition enhancers, finely dispersed carbohydrate particles present in the combustion zone following evaporation of the liquid fuel components prior to ignition may or may not have a role as ignition enhancer, however such species present may contribute to more complete and rapid combustion of the total air/fuel mixture.

While additional ignition improvers can be incorporated into the main fuel, the techniques described herein facilitate ignition throughout the engine operating range without such additions. Thus according to some embodiments the main fuel is free of ignition improver additives. In other embodiments, the main fuel is free of DME (although it may contain other ignition improvers). In the case of dimethyl ether as an ignition improver, according to some embodiments, less than 20%, less than 15%, less than 10%, less than 5%, less than 3%, less than 1%, or no dimethyl ether is present in the fuel composition. In some embodiments, the amount of ether (of any type, such as dimethyl or diethyl ether) in the main fuel composition is less than 20%, less than 15%, less than 10%, less than 5%.

In some embodiments, at least 80% of the ignition enhancer present in the main fuel composition is provided by one or at most two specific chemicals, examples being dimethyl ether and diethyl ether. In one embodiment, an ignition enhancer of a single chemical identity is present in the main fuel composition. In one embodiment, at least 80% of the ignition enhancer in the main fuel composition is constituted by an ignition enhancer of a single chemical identity. In each case, the single ignition enhancer that constitutes the ignition enhancer, or the >80% ignition enhancer component may be dimethyl ether. In other embodiments, the ignition enhancer comprises a mixture of three or more ignition enhancers.

The amount of ignition enhancer in the main fuel composition in some embodiments is not more than 20%, such as not more than 10% or not more than 5% of the fuel composition.

2. Fuel Extender. A fuel extender is a material that provides heat energy to drive the engine. Materials used as fuel extenders may have this purpose as the main purpose for its inclusion in the fuel composition, or an additive material may provide this function and another function. Examples of such Fuel Extenders are:

a) Carbohydrates. Carbohydrates include sugars and starch. The carbohydrate may be included for fuel extender purposes, although it may also function as an ignition improver, and/or a combustion improver. The carbohydrate is preferably water/methanol soluble, with higher water levels accommodating greater dissolution of sugar, for example, in the main fuel. An enriched water (single phase) main fuel composition enables dissolution of the carbohydrate, such as sugar, however as the liquid solvent (water/methanol) in the fuel composition evaporates in the engine, the carbohydrate solute can form micro-fine high surface area suspended particles of low LEL (lower explosive limit) composition which will decompose/react under engine conditions, improving the ignitability of the main fuel mixture. To achieve improvement in combustibility of the mixture, an amount of at least 1%, preferably at least 1.5% and more preferably at least 5% of this carbohydrate additive is preferred.

b) Soluble Fuel Extender additives. Fuel extender additives are combustible materials. These additives may be added as separate components or may be part of an undistilled methanol used to produce the main fuel composition. Such additives include C2-C8 alcohols, ethers, ketones, aldehydes, fatty acid esters and mixtures thereof. Fatty acid esters such as fatty acid methyl esters may have a biofuel origin. These may be sourced through any biofuel sources or processes. Typical processes for their production involve transesterification of plant-derived oils, such as rapeseed, palm or soybean oil, amongst others.

There may be opportunity to economically increase the level of fuel extender in the main fuel composition itself for particular markets where such additive can be produced or grown and consumed locally, reducing the need for importation of base fuel and/or additives. Under such conditions an amount, or treat rate, of up to 30%, or up to 40%, or up to 50% of the main fuel composition is preferred, though concentrations of up to 60% total additives including such fuel extender additives can be considered particularly where the methanol source is crude methanol.

3. Combustion enhancers. These may also be referred to as combustion improvers. An example of a combustion enhancer is a nitrated ammonium compound, for example ammonium nitrate. At 200° C. ammonium nitrate breaks down to nitrous oxide according to the following reaction:

$$NH_4NO_3 = N_2O + 2H_2O$$

The nitrous oxide formed reacts with fuel in the presence of water in a similar way to oxygen, eg $$CH_3OH + H_2O = 3H_2 + CO_2$$

$$H_2 + N_2O = H_2O + N_2$$

$$CH_3OH + 3N_2O = 3N_2 + CO_2 + 2H_2O$$

Other nitrated ammonium compounds that can be used include ethylammonium nitrate and triethylammonium nitrate as examples, though these nitrates may also be regarded as ignition enhancers (cetane) rather than combustion enhancers as their main function in the fuel is ignition enhancement.

Other combustion improvers can include metallic or ionic species, the latter forming by dissociation under pre or post combustion environments.

4. Oxygen absorbing oil. The oxygen absorbing oil is preferably one that is soluble in water methanol mixtures. Oxygen absorbing oils have low auto-ignition point and also have the ability to directly absorb oxygen prior to combustion, in amounts of, for example, 30% by weight of the oil. This rapid condensation of oxygen from a hot gaseous phase into the oil/solid phase after evaporation of the surrounding water will more rapidly heat the oil particle causing ignition of the surrounding evaporated and superheated methanol. An oil ideally suited to this role is linseed oil, in a concentration of about 1-5% in the main fuel mixture. If this additive is utilised in the main fuel composition, the fuel mixture should be stored under an inert gas blanket to minimise decomposition of the oil by oxygen. Linseed oil is a fatty acid-containing oil. Other fatty acid-containing oils can be used instead of or in addition to linseed oil. Preferred oils are those that dissolve in the methanol phase or are miscible in methanol, to produce a homogeneous, single phase composition. However, in some embodiments oils that are not water/methanol miscible may be used, particularly if an emulsification additive is also present in the fuel composition.

5. Lubricity additives. Examples of lubricity additives include diethanolamine derivatives, fluorosurfactants, and fatty acid esters, such as biofuels which are soluble to some extent in water/methanol mixtures, on which the main fuel composition is based.

6. Product colouration additives. Coloration additives assist to ensure that the fuel composition could not be mistaken for a liquid beverage such as water. Any water soluble colourant may be used, such as a yellow, red, blue colourant or a combination of these colourants. The colourant may be a standard accepted industry liquid colourants.

7. Flame colour additives. Non-limiting examples include carbonates or acetates of sodium, lithium, calcium or strontium. The flame colour additives may be selected to achieve the preferred product colour and stability in the final product pH. Engine deposition considerations, if any, may be taken into account in selecting the additive to be used.

8. Anti Corrosion additives. Non-limiting examples of anti-corrosion additives include amines and ammonium derivatives.

9. Biocides. While biocides could be added, these are generally not required because the high alcohol (methanol) content in the main fuel prevents biological growth or biological contamination. Thus according to some embodiments the main fuel is free of biocide.

10. Freeze Point depressant. While freeze point depressants can be incorporated into the main fuel, the methanol (and optional additives such as sugar, added for other purposes) depresses the freezing point of water. Thus according to some embodiments the main fuel is free of an additional dedicated freeze point depressant.

11. Deposit reductant. Non-limiting examples include polyether and triethanolamine.

12. Denaturant if required.

13. pH controlling agent. An agent that raises or lowers the pH to a suitable pH can be used, which is compatible with the fuel.

The additives, and particularly those identified under items 1 and 2 above may be added to the relevant fuel (pre-fuel or main fuel) either as standard industry traded product (i.e. in a refined form) or as semi processed aqueous solution (i.e. in a non-refined form, semi-refined form, or a crude form). The latter option potentially reduces the cost of the additive. A condition of the use of such crude additive sources is that the impurities in the crude forms of such additives, such as crude sugar solution, or sugar syrup, as one example, do not adversely affect the fuel injectors or engine performance.

According to some embodiments, the main fuel comprises at least one additive. According to some embodiments, the main fuel comprises at least two different additives. These additives may be introduced through adjustment to the main fuel composition after evaporation of at least a portion of the dimethyl ether from the pre-fuel composition.

Ethers are noted above as being examples of ignition improvers and soluble fuel extender additives. Irrespective of the intended function, in some embodiments, the ether may be present in total at a level of less than 20%, less than 15%, less than 10%, less than 5%, less than 3%, or less than 1% of the fuel composition. The amount may be greater than 0.2%, 0.5%, 1%, 2%, 3%, 4%, 5%, 6%, 7%, 8%, 9%, 10%, 12%. The lower and upper limits can be combined without limitation, provided the lower limit is below the upper limit selected.

The pre-fuel composition may comprise ethers other than dimethyl ether, but according to preferred embodiments, the pre-fuel comprises dimethyl ether as the only ether component. The main fuel composition may comprise ether in the amounts indicated above, and may comprise dimethyl ether as the only ether. In other embodiments, additional ether is included in the main-fuel composition in addition to dimethyl ether.

It is to be noted that references to the main fuel composition comprising methanol and water, and not more than 20% by weight dimethyl ether, should be interpreted as encompassing main fuel compositions containing no dimethyl ether. However, according to some embodiments, dimethyl ether is present in the main fuel composition, in an amount greater than 0.2%, or one of the other minimum percentage amounts indicated above.

In some embodiments, the main fuel composition comprises an ether in an amount of between 0.2% and 10% by weight of the main fuel composition. The ether is preferably a single ether or a combination of two ethers. The ether is preferably dimethyl ether.

Fumigant Comprising Dimethyl Ether

The fumigant produced in the process of the present application, for use in a compression ignition engine, comprises dimethyl ether. Dimethyl ether fall within the class of materials referred to herein as ignition enhancers. The fumigant may additionally comprise another ignition enhancer. The additional ignition enhancer may be added to the dimethyl ether vapour collected for use as a fumigant when water is added to the pre-fuel composition, prior to use of the fumigant for fumigating the intake air stream. The fumigant may further comprise other components, such as one or more of methanol, water and any of the additives outlined above in the context of the main fuel.

Suitable ignition enhancers for use with dimethyl ether in the fumigant may have a cetane of above 40. The cetane number is a measure of a materials ignition delay, being the time period between the start of injection and start of combustion, i.e. ignition, of that material. DME has a cetane of 55-57. The cetane number(s) of additional the ignition enhancer(s) that may be present in the fumigant should be taken into account when determining the relative amounts of ignition enhancers to other components in the fumigant, and also the amount of fumigant compared to the main fuel composition, load and engine speed. The overall cetane of the fumigant will be based on a combination of the proportional contribution of, and the cetane property of each component, the relationship not necessarily being linear.

Some non limiting examples of additional ignition enhancers which can be included in the fumigant in addition to dimethyl ether include:
- ethers, such as the lower alkyl (being the C1-C6 ethers),
- alkyl nitrates,
- alkyl peroxides, and mixtures thereof.

The dimethyl ether suitably comprises a minimum of 5% of the fumigant or a minimum of 10% of the fumigant, such as a minimum 15%, 20%, 30%, 40%, 50%, 60%, 65%, 70%, 75%, 80%, 82%, 84%, 86%, 88% or 90% of the fumigant. There is generally a preference for the dimethyl ether content of the fumigant to be at the upper end of the range, so in some embodiments the ignition enhancer content is above 70% or more. The dimethyl ether may comprise up to 100% of the fumigant.

The relative amounts of each component in the fumigant may be kept constant, or may be varied over the time period of operation of the engine. Factors that impact on the relative amounts of components in the fumigant include engine speed (rpm), level and variability of load, engine configuration, and the specific properties of the individual components of the fumigant. In other embodiments, the fumigant composition may be kept relatively constant, and instead the relative amount of fumigant (grams per second fumigated into the engine) compared to the main fuel composition injected into the engine (grams per second) is adjusted during the different stages of operation of the engine.

When it is desired to operate the CI engine with different fumigant compositions for different engine operation conditions (speed, load, configuration), the fumigant composition can be varied to suit by computer control of the fumigant composition, or by any other form of control. The adjustments may be sliding adjustments based on an algorithm that calculates the desired fumigant composition to match the prevailing engine operation conditions, or may be step-wise adjustments. For example, a higher overall cetane index fumigant (such as 100% DME) could be fumigated into the engine at a high weight % with respect to the fuel for operation in some conditions, and then the fumigant could be diluted with a lower cetane index component in other engine operation conditions. In another embodiment the composition may be stable and the air/fumigant ratio varied in changing conditions.

Examples of components that may be present in the fumigant in addition to the ignition enhancer include the additives outlined above and alkane gases (typically straight-chained alkanes, including lower alkanes such as the C1-C6 alkanes, notably methane, ethane, propane or butane, and longer chain alkanes (C6 and above).

Engine Operation Aspects and Power Generation

The amount of ignition enhancer(s) may be controlled relative to the mix of methanol to water contained in the main fuel in order to produce conditions within the combustion chamber where ignition of the main fuel is achieved in a timely manner, and thereby deliver the best possible thermal efficiency from the engine. Where the ratio of ignition enhancer to fuel mix is not controlled combustion could initiate significantly before top dead centre (TDC), such as 25-30° before TDC, and as such the use of an ignition enhancer could have a neutral effect and make a minimal or no contribution to the thermal efficiency of the engine. In a preferred operation of the engine ignition of the fumigant/air mixture is timed to delay the combustion of this fuel as late as possible (to avoid unnecessarily working against the power stroke of the engine) and to be consistent with good combustion of the main fuel after injection. This means that the fumigant (dimethyl ether) should ignite before the main fuel injection commences, but not so much before that the energy contained in the secondary fuel makes a minimal or nil contribution to the thermal efficiency of the engine.

Although the relative amounts of fumigant to main fuel introduced into the engine (either through the air intake, or into the combustion chamber, respectively), will vary depending on the engine operation conditions that apply, it is generally desired for the amount of dimethyl ether ignition enhancer in the fumigant during steady state operation at mid or high load to be a relatively low percentage by weight of the main fuel composition. For a fumigant comprising 100% DME, the relative amounts of fumigant to main fuel by weight is desirably up to 20% by weight, up to 18%, up to 15%, up to 13%, up to 10%, up to 8%, up to 7%, up to 6%, up to 5%. The fumigant level is preferably at least 0.2%, at least 0.5%, at least 1% or at least 2% by weight of the main fuel composition. These figures are based on weight, assuming the fumigant comprises 100% ignition enhancer, and can be adjusted proportionally for a reduced ignition enhancer content in the fumigant by weight. These may be measured by reference to the amount introduced into the engine in grams per second, or any other suitable corresponding measure for the engine size. An upper limit of around 10% or less (such as 8% or 7%) is additionally advantageous, as a pre-fuel composition containing up to the required amount of dimethyl ether (such as 10%, 8% or 7% dimethyl ether, respectively) can be delivered to the compression ignition engine location, and a portion (or all) of the dimethyl ether driven off through water addition and recovered in a quantity corresponding to the needs of the engine operating with fumigation at the same target level. In other embodiments, there can be top-up of the fumigant level to a higher level at the engine location (for example, through top-up from separate storage of dimethyl ether).

Using the pre-fuel composition in the manner described above enables power generation systems and structures to be developed to efficiently generate power at reduced emission levels, and which can also treat the engine exhaust to capture and then re-use or re-direct heat and water from exhaust gases. The re-use, or recycling, of heat and water promotes increased system efficiencies and overall reduced waste products and emissions. The re-direction of heat and water can find use in a range of unrelated applications involving heating and cooling localities/quarters and the regeneration of water for use by communities or as part of other systems. Details of the features of such systems are as described in our co-pending application referred to above, the entirety of which is incorporated herein by reference.

The present application will now be described in further detail with reference to the following non-limiting Examples of a process in accordance with the present application.

EXAMPLES

Example 1

One embodiment of the invention is described in detail with reference to FIG. 4.

Figure 4:
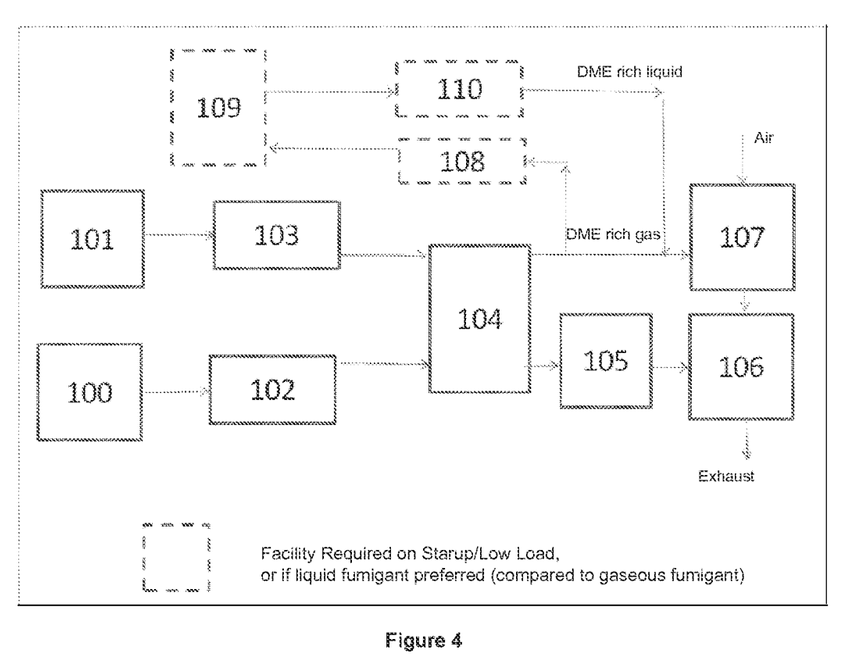
FIG. 4 is a flow chart illustrating a process for operating a compression ignition engine using a pre-fuel composition of one embodiment of the invention.

FIG. 4 is a flow chart illustrating the stages of the process of the present invention.

100 Water rich tank. This is a storage tank whose primary purpose is to store purified water. This tank may be insulated and heated for very cold climates, or alternatively may be unheated and contain freezing point depressant such as methanol, to prevent freezing of the liquid in the tank and fuel supply lines. The storage tank is replenished periodically with purified water and/or antifreeze or other additives compatible with the intended use.

101 Tank containing a mixture of methanol and DME, unheated, replenished periodically with a mixture of DME and methanol, and any other components or additives present compatible with the intended use.

102 Low pressure pump for transferring material from 100 to the fuel mixer 104.

103 Low pressure pump for transferring material from 101 to the fuel mixer 104.

104 Pre-fuel/water mixer and gas/liquid separator, with optional pre-heater, receiving liquids from pumps 102 and 103

105 High pressure injection pump to provide fuel from 104 to the engine 106.

106 Compression ignition engine

107 Mixer which mixes fumigant in the form of a gas or liquid, which receives DME rich vapour from 104 and/or DME rich liquid from pump 110. Air may be taken in directly from the atmosphere or via a preheating step though turbocharging, or heat exchange.

108 DME rich vapour compressor and condenser, taking gas feed from 104 with liquid to storage tank 109

109 DME rich storage tank for periodical replenishment from outside sources, or DME rich liquid received from 108

110 DME rich pump for injecting DME rich liquid into 107

Using the basic stages outlined in FIG. 4, the process for generating a main fuel composition and a fumigant comprising dimethyl ether of one embodiment of the invention is put into practice.

A pre-fuel composition is prepared from methanol and dimethyl ether, and supplied to a first tank 101. The location for the production of the pre-fuel composition (not represented in FIG. 4) may be at the site of the compression ignition engine (where the pre-fuel is converted into the two fuel parts—the main fuel and the fumigant), or distant from the site. In the embodiment of this example, the pre-fuel is transmitted in a non-pressurised liquid pipeline to tank 101, although pressurised pipelines can be used if desired. The quantity of dimethyl ether in the pre-fuel depends on the temperature (and, where relevant, pressure) at which the fuel is transmitted in the pipeline, but in this embodiment is less than 10% of the total fuel amount, and in some embodiments in the range of 7%-8%. This amount is suitable for atmospheric pressure conditions in transport, such as a liquid pipeline at atmospheric pressure.

After being transmitted through pipelines, the pre-fuel arrives at the location of the compression ignition engine 106, and is stored in tank 101. The compression ignition 106 may form one component of a power generation plant.

Water is stored in water tank 100. Pumps 102 and 103 pump the pre-fuel stored in tank 100 and the water stored in tank 101, respectively, to a pre-fuel/water mixer and gas/liquid separator 104. When water comes into contact with the pre-fuel in mixer 104, a portion of the dimethyl ether, in a quantity dictated by the temperature, % DME in the pre-fuel, and pressure, is driven out of the pre-fuel composition as a vapour, which is separated through gas/liquid separation. The quantity of dimethyl ether separated in this manner can be calculated using the information provided in the detailed description above. In other embodiments heat may also be applied to drive a greater amount of dimethyl ether from the pre-fuel composition during the dimethyl ether removal step. The heat source could be low level waste heat from the engine exhaust, or from any other hot water stream. The temperature of this heat source may suitably be between 50° C.-60° C., 60-70° C. or 70-100° C.

The liquid phase produced during this step forms a main fuel composition which can be pumped through pump 105 into the compression ignition engine 106. The main fuel composition can be adjusted prior to being used in the compression ignition engine 106, in the manner described previously. In some embodiments the methanol rich phase to be used as a main-fuel (optionally following adjustment in composition) may include low amounts of DME, for example up to 5%, 4%, 3%, 2% or 1% DME. In other embodiments a high proportion of DME may be retained in the liquid phase with only sufficient DME to ensure good and complete combustion being vaporised and utilised as fumigant 105. For example if the fuel from the manufacturing plant includes 7% DME, 5% of this may be retained in the liquid phase with 2% being used as fumigant 105 for adding to heated air entering the engine 106. The amounts that can be retained in the liquid phase forming the main fuel composition will depend on the prevailing temperature, pressure and water % in the liquid phase.

Part or all of the DME separated from the pre-fuel may be used as the fumigant for fumigating the inlet air stream going into the compression ignition engine. This occurs in mixer 107. When only part of the DME separated from the pre-fuel is required for fumigation, the remainder may be directed through a vapour compressor and condenser 108 in which the DME vapour is compressed and condensed, and directed to a DME storage tank 109. Thereafter, the collected DME may be used to increase or supplement the DME amount being mixed with air during inlet air fumigation in mixer 107. For example, during start-up operation, a DME rich intake air stream may be desired. This is achieved through pumping stored DME through pump 110 into the DME conduit or into the mixer 107 directly. The DME storage tank 109 may additionally, or alternatively, be supplied with DME from outside sources. The boxes marked in dashed lines in FIG. 4 indicate that these components of the process may be utilised during startup or low load operations, or in circumstances where a fumigant in liquid phase is desired (compared to the gaseous phase).

The fumigant stream that is supplied to the mixer 107 may consist of DME, or may consist essentially of DME, or alternatively, the composition of the fumigant may be adjusted to include further components. This may be achieved through changing the composition of the fumigant directed into the mixer 107, or through direct addition or fumigation of separate fumigant components into the mixer to be combined with the inlet air for the compression ignition engine.

The pre-processing stage may also include a step of using surplus DME separated from the pre-fuel and stored in tank 109 as an ingredient for other processes. For example, surplus DME could benefit a nearby community by providing surplus heat to a hot water loop. Alternatively or additionally, the DME could be integrated with generator plant processes. Methanol fuel, whether before or after processing, could also be removed from the power generating system and used for local chemical manufacture.

The exhaust from the compression ignition engine 106 may be used in the manner described in detail in our co-pending application, referred to previously. Examples include removing water from the exhaust gas for re-use. The water may be re-used by being directed to the water storage tank 100, or may be used directly as the water source in the mixer 104. Exhaust heat may be used in a local community hot water loop, or in any heat recovery operations.

Additional Data

An experimental programme was undertaken by the University of Melbourne on the performance and engine-out emissions of different combinations of main fuel compositions with fumigants comprising dimethyl ether, and the results are reported in our co-pending application, referred to above. The creation of those two-part fuels (main fuel and fumigant) by the present method enables the two-part fuel to be put to use in a compression ignition engine in the manner described in that application.

In addition, a separate programme was undertaken by the University of Queensland (see Table 1) where laboratory measurements were taken of the Methanol/Water/Dimethyl ether equilibrium, and compared to Raolt's Law to demonstrate the ability of water to destabilise DME in the 3 component mixture. In every case DME was the predominant gaseous species present.

Table 1 shows the actual vapour pressure behaviour of a methanol/water DME system, compared to the ideal Raolt's Law calculation. The table presents the results grouped into ranges for the DME and water content (with the balance being methanol) to tabulate and show the trends. It is clear from this table that across the four water content groupings examined, the deviation from Raoult's Law leading to destabilisation of DME in the liquid phase is enhanced by lower temperature and higher water content. The peak deviation measured was at a ratio of 6.1 at 10 degrees C. The effect of the water addition is that with its high heat capacity compared to other components present, water at a suitable temperature is an ideal method of generating DME vapour without the application of direct heating of the bulk pre-fuel using mechanisms such as heat jackets or electrical heating elements.

TABLE 1

Ratio of Measured Vapour Pressure vs Raoult's Law
Data measured at −10, 0, 10, 15 and 25 degrees C.

|  | Nil-10% H2O | 10%-20% H2O | 20-30% H2O | >30% H2O |
|---|---|---|---|---|
| Results at T = −10 deg C. | | | | |
| 0-5% DME | | | | |
| 5-10% DME | | | | |
| 10-15% DME | | | | |
| 15-20% DME | 3.8 | 4.3, 5.2 | 5.24 | |
| 20-25% DME | 3.4 | | | |
| Results at T = 0 deg C. | | | | |
| 0-5% DME | | | | |
| 5-10% DME | | | | |
| 10-15% DME | | 3.6 | 4.3 | |
| 15-20% DME | 2.8, 2.89 | | 3.5 | |
| 20-25% DME | | | | |
| Results at T = 10 deg C. | | | | |
| 0-5% DME | | | | |
| 5-10% DME | | | | 6.1 |
| 10-15% DME | 2.4, 2.4 | 3.2 | 3.7 | |
| 15-20% DME | | | | |
| 20-25% DME | | | | |
| Results at T = 15 deg C. | | | | |
| 0-5% DME | | | | |
| 5-10% DME | | | 3.3 | |
| 10-15% DME | | | 3.2, 3.1 | |
| 15-20% DME | | | | 3.4, 3.3, 3.2 |
| 20-25% DME | | | | |
| Results at T = 25 deg C. | | | | |
| 0-5% DME | | | | 3.9 |
| 5-10% DME | 2.19, 2.17 | | 3.0, 3.4 | 3.5 |
| 10-15% DME | | | | |
| 15-20% DME | | | | |
| 20-25% DME | | | | |

The invention claimed is:

1. A process for generating a main fuel composition comprising methanol and water and not more than 20% by weight dimethyl ether, and a fumigant comprising dimethyl ether, the process comprising:
    providing a pre-fuel composition comprising methanol and dimethyl ether,
    adding water to the pre-fuel composition to cause or aid evaporation of at least a portion of the dimethyl ether from the pre-fuel composition,
    collecting the portion of dimethyl ether evaporated from the pre-fuel composition for use as a fumigant, and
    using the remainder of the pre-fuel composition comprising methanol and water as a main fuel composition.

2. The process of claim 1, further comprising:
    transporting the pre-fuel composition comprising methanol and dimethyl ether from a first location to a second location remote from the first location.

3. A process of claim 1, further comprising:
    fumigating an intake air stream of a compression ignition engine with the fumigant comprising dimethyl ether;
    introducing the fumigated intake air into a combustion chamber in the engine and compressing the intake air;
    introducing the main fuel into the combustion chamber; and
    igniting the main fuel/air mixture to thereby drive the engine.

4. The process of claim 3, including fumigating the intake air with the fumigant to an amount of 0.5%-70% wt of main fuel.

5. The process of claim 3, including preheating the intake air in the combustion chamber before feeding the main fuel into the combustion chamber.

6. The process of claim 1, wherein the water is at a temperature of between 30° C. and 80° C.

7. The process of claim 1, wherein the step of adding water to the pre-fuel composition causes evaporation of at least 5% by weight of the dimethyl ether present in the pre-fuel composition from the pre-fuel composition.

8. The process of claim 1, wherein the step of adding water to the pre-fuel composition causes evaporation of at least 20% by weight of the dimethyl ether present in the pre-fuel composition from the pre-fuel composition.

9. The process of claim 1, wherein water is added in an amount sufficient to produce a main fuel composition comprising water and methanol in a ratio of between 3:97 to 80:20.

10. The process of claim 1, wherein water is added in an amount sufficient to produce a main fuel composition comprising from 3% to 40% water, and not more than 20% dimethyl ether.

11. The process of claim 1, wherein water is added in an amount sufficient to produce a main fuel composition comprising between 12% and 23% water, methanol, and not more than 20% by weight of additives.

12. The process of claim 1, wherein the pre-fuel comprises crude methanol.

13. A process of operating a compression ignition engine using a main fuel comprising methanol and water and not more than 20% by weight dimethyl ether, including:
    providing a pre-fuel composition comprising methanol and dimethyl ether,
    adding water to the pre-fuel composition to cause or aid evaporation of at least a portion of the dimethyl ether from the pre-fuel composition,
    collecting the portion of dimethyl ether evaporated from the pre-fuel composition for use as a fumigant,
    using the remainder of the pre-fuel composition comprising methanol and water as a main fuel composition,
    fumigating an intake air stream of the compression ignition engine with the fumigant comprising dimethyl ether;
    introducing the fumigated intake air into a combustion chamber in the engine and compressing the intake air;
    introducing the main fuel into the combustion chamber; and
    igniting the main fuel/air mixture to drive the engine.

14. A process for generating power using a compression ignition engine fuelled by a main fuel composition comprising methanol and water and not more than 20% dimethyl ether, the process comprising:
    providing a pre-fuel composition comprising methanol and dimethyl ether,
    adding water to the pre-fuel composition to cause or aid evaporation of at least a portion of the dimethyl ether from the pre-fuel composition,
    collecting the portion of dimethyl ether evaporated from the pre-fuel composition for use as a fumigant,
    using the remainder of the pre-fuel composition comprising methanol and water as a main fuel composition,
    operating a compression ignition engine using the main fuel composition to generate power;
    fumigating the inlet air stream of the compression ignition engine with the fumigant comprising dimethyl ether;
    treating engine exhaust to recover exhaust heat and/or water from the engine, and
    redirecting the heat and/or water for further use.

15. The power generation system claimed in claim 14, comprising redirecting the water recovered from the engine exhaust for use in the step of adding water to the pre-fuel composition to cause evaporation of the dimethyl ether from the pre-fuel composition.

16. The power generation system claimed in claim 14, comprising exchanging heat from the exhaust gas through a heat exchanger to water in a hot water loop, and transferring heat in the water through the hot water loop to a local community.

17. The power generation system as claimed in claim 14, wherein the step of adding water to the pre-fuel composition to cause evaporation of at least a portion of the dimethyl ether is performed using water at a temperature above ambient.

18. The process of claim 14, wherein water is added in an amount sufficient to produce a main fuel composition comprising from 3% to 40% water, and not more than 20% dimethyl ether.

19. The process of claim 14, wherein water is added in an amount sufficient to produce a main fuel composition comprising between 12% and 23% water, methanol, and not more than 20% by weight of additives.

20. A method for supplying fuel to a compression ignition engine, the method comprising:
    supplying a pre-fuel composition comprising methanol and dimethyl ether,
    adding water to the pre-fuel composition to cause or aid evaporation of at least a portion of the dimethyl ether from the pre-fuel composition,
    supplying the portion of dimethyl ether evaporated from the pre-fuel composition to an air intake of the compression ignition engine, or to a tank that is in fluid connection to the air intake of the compression ignition engine, for use as a fumigant,
    supplying the remainder of the pre-fuel composition comprising methanol and water to a second tank that is in fluid connection to a combustion chamber of the compression ignition engine for use as a main fuel composition.

* * * * *